United States Patent
Cap et al.

(10) Patent No.: US 12,284,270 B2
(45) Date of Patent: Apr. 22, 2025

(54) SYSTEMS AND METHODS FOR PROVIDING SIGNATURELESS, CONFIDENTIAL AND AUTHENTICATION OF DATA DURING HANDSHAKE FOR CLASSICAL AND QUANTUM COMPUTING ENVIRONMENTS

(71) Applicant: QuSecure, Inc., San Mateo, CA (US)

(72) Inventors: Chris Cap, Bayville, NJ (US); Barry Van Hooser, Pleasanton, CA (US); Sarah McCarthy, Carrickfergus (GB); Louie Gasparini, San Mateo, CA (US)

(73) Assignee: QuSecure, Inc, Petaluma, CA (US)

( * ) Notice: Subject to any disclaimer, the term of this patent is extended or adjusted under 35 U.S.C. 154(b) by 447 days.

(21) Appl. No.: 17/583,150

(22) Filed: Jan. 24, 2022

(65) Prior Publication Data

US 2022/0345298 A1 Oct. 27, 2022

Related U.S. Application Data

(60) Provisional application No. 63/180,504, filed on Apr. 27, 2021, provisional application No. 63/180,650, filed on Apr. 27, 2021.

(51) Int. Cl.
*H04L 9/08* (2006.01)
*H04L 9/40* (2022.01)

(52) U.S. Cl.
CPC .......... *H04L 9/0825* (2013.01); *H04L 9/0863* (2013.01); *H04L 9/0869* (2013.01); *H04L 63/0869* (2013.01)

(58) Field of Classification Search
None
See application file for complete search history.

(56) References Cited

U.S. PATENT DOCUMENTS

| | | | |
|---|---|---|---|
| 8,566,247 B1* | 10/2013 | Nagel | H04L 63/045 380/270 |
| 11,212,090 B1* | 12/2021 | Griffin | H04L 63/061 |
| 2008/0294726 A1* | 11/2008 | Sidman | H04L 9/0825 380/259 |
| 2015/0288514 A1* | 10/2015 | Pahl | H04L 63/166 713/171 |
| 2016/0359822 A1* | 12/2016 | Rivera | H04L 63/0435 |
| 2017/0063810 A1* | 3/2017 | Bruce | H04L 63/126 |

(Continued)

*Primary Examiner* — Bassam A Noaman
(74) *Attorney, Agent, or Firm* — Barry S. Van Hooser; Derek Jennings

(57) ABSTRACT

Systems and methods for handshaking, without a certificate authority, to provide at least post-quantum communications security over a computer network. The method generates an authentication tag, hashing, by an initiator, a concatenation of unique identifiers of the initiator and a recipient. The method also generates an encrypted text, symmetrically encrypting, by the initiator that is configured to use a shared secret, a concatenation of the authentication tag and the unique identifiers of the initiator and the recipient. The method further includes sending the encrypted text from the initiator to a server. The method also includes symmetrically decrypting, by the server that is configured to use the shared secret, the encrypted text. The method further includes authenticating, by the server, the encrypted text. The method also includes generating a session key and providing the session key from the server to the initiator.

58 Claims, 12 Drawing Sheets

(56) References Cited

U.S. PATENT DOCUMENTS

| | | | |
|---|---|---|---|
| 2020/0327771 A1* | 10/2020 | Restivo | G06Q 50/34 |
| 2021/0400031 A1* | 12/2021 | Ilic | H04L 63/10 |
| 2022/0078186 A1* | 3/2022 | Gurel | H04L 9/0841 |
| 2022/0104011 A1* | 3/2022 | Fischer | H04W 12/0431 |

* cited by examiner

122

| Unique Identifier | Password Hash | Address | Symmetric Key(s) |
|---|---|---|---|
| Unique Identifier | Password Hash | Address | Symmetric Key(s) |

• • •

| Unique Identifier | Password Hash | Address | Experimental KEM Secret Key | Symmetric Key(s) |
|---|---|---|---|---|

| Handle | Unique Identifier | Number of Bytes | Symmetric Key(s) | Number of Bytes | Symmetric Key(s) |
|---|---|---|---|---|---|
| Handle | Unique Identifier | Number of Bytes | Symmetric Key(s) | | |

• • •

| Handle | Unique Identifier | Number of Bytes | Symmetric Key(s) | Number of Bytes | Symmetric Key(s) |
|---|---|---|---|---|---|

```
Send the length of the buffer using Authentication
Encryption with Associated Data (AEAD)
402
        │
        ▼
Send the buffer using AEAD
404
```

```
Initiator sends their unique identifier concatenated with the
recipient's unique identifier to the server using AEAD
502
        │
        ▼
Server generates session key
504
        │
        ▼
Server encrypts initiator unique identifier concatenated with
initiator address using AEAD with shared secret stored for
recipient, producing encrypted text
506
        │
        ▼
Server sends recipient address concatenated with session
key and encrypted text to initiator using AEAD with shared
secret stored for initiator
508
```

```
┌─────────────────────────────────────────────┐
│ Initiator uses variable length Buffer Handshake to send │
│ their unique identifier concatenated with the unique    │
│ identifier of each recipient to te server               │
│                    512                                  │
└─────────────────────────────────────────────┘
                      │
                      ▼
┌─────────────────────────────────────────────┐
│ The server generates a session key for each recipient   │
│                    514                                  │
└─────────────────────────────────────────────┘
                      │
                      ▼
┌─────────────────────────────────────────────┐
│ The server encrypts the initiators unique identifier, the │
│ initiator's address, and the session key for each recipient │
│ with AEAD using the shared secret stored for each recipient, │
│         producing encrypted texts                       │
│                    516                                  │
└─────────────────────────────────────────────┘
                      │
                      ▼
┌─────────────────────────────────────────────┐
│ The server encrypts the initiators unique identifier, the │
│ initiator's address, and the session key for each recipient │
│ with AEAD using the shared secret stored for each       │
│         recipient, producing encrypted texts            │
│                    518                                  │
└─────────────────────────────────────────────┘
```

To generate a ciphertext, initiator encapsulates, using KEM public key of server, shared secret for initiator
602

↓

Initiator sends ciphertext to server
604

↓

To generate shared secret for initiator, server decapsulates, using KEM private key of server, ciphertext
606

To generate a ciphertext, initiator encapsulates, using KEM public key of server, shared secret
612

↓

To generate a second ciphertext, initiator encapsulates, using KEM public key of server, a second shared secret
614

↓

Initiator sends ciphertext encapsulated with second ciphertext to server
616

↓

To generate shared secret, server decapsulates, using KEM private key of server, the ciphertext
618

↓

To generate second shared secret, server decapsulates, using KEM private key of server, the second ciphertext
620

Client sends unique identifier concatenated with
password to server using AEAD
902

FIG. 9

SYSTEMS AND METHODS FOR PROVIDING SIGNATURELESS, CONFIDENTIAL AND AUTHENTICATION OF DATA DURING HANDSHAKE FOR CLASSICAL AND QUANTUM COMPUTING ENVIRONMENTS

The applicant claims the benefit under 35 USC 119(e) of U.S. Provisional Application No. 63/180,504 filed on Apr. 27, 2021, and U.S. Provisional Application No. 63/153,382 filed on Feb. 25, 2021, which is incorporated herein by reference in its entirety.

FIELD OF THE INVENTION

The present disclosure relates to system providing a quantum channel security protocol.

BACKGROUND

Transport Layer Security (TLS) is a widely deployed protocol over IP networks for providing a non-quantum secure channel between two communicating hosts, typically a client and a server. In fact, Transport Layer Security (TLS) allows client/server-based applications (such as Web browsing, electronic mail, Voice-over-IP, video-phoning, video-conferencing, Internet faxing, or instant messaging) to communicate, while preventing eavesdropping and message forgery and tampering.

TLS includes a handshake protocol for authentication and security parameters negotiation between two communicating entities, and a record protocol for data transfer between these two communicating entities using the parameters agreed via the handshake protocol.

For establishing a Transport Layer Security (TLS) session, the handshake protocol—as defined in RFC2246—allows peers to agree upon security parameters for the record layer (such as the encryption algorithm and the encryption keys), to authenticate themselves, to instantiate negotiated security parameters and to report error conditions to each other. these tasks are performed through a series of handshake messages exchange in a specific order between a client and a server.

The client sends a "Client Hello" message to the server; the server responds with a "Server Hello" message. In the two hello messages, the client and the server agree on security parameters and authenticate themselves: the server sends its certificate to the client. If needed, it sends also a certificate request in the same message. It might also send a "server key exchange" message if the certificate is not sufficient. in response, the client sends a "client key exchange" message and its certificate to the server along with a "certificate verify" message so that the server explicitly verify this certificate; both, the client and the server send "change cipher spec" messages and proceed directly to finished messages. Subsequently, the client and the server may begin to send and receive application data using the negotiated session parameters.

It follows that the handshake protocol checks the identity of the client after exchanging the certificates for authentication.

However, such approach for client identity verification by the server may represent a serious problem for many reasons.

In fact, for instance, in a wide communication network such as Internet, a server providing a certain service (including business transactions) is particularly subject to strange clients with no prior relationship and no common security domain with them. In this case, the server does check the identity of clients only by the end (i.e. at the conclusion) of the handshaking.

Furthermore, a server may be interested to serve only particular clients (for example, being in a predefined list or being located in a given state). Nevertheless, according to the existing TLS handshake protocol, this server is constrained to carry out more than one step of the handshake protocol to check the identity of clients, and to be able to decide on the continuation of the interaction.

Yet another problem is that the server's behavior regarding certificates exchange and cipher negotiation during TLS handshake is the same, without any relevance to the identity of the clients. Accordingly, there is no way for a server to know which client is triggering a TLS handshake before the handshake is actually finished.

There have various efforts towards developing a quantum-secure version of TLS. Initial efforts analyze the effect of replacing the vulnerable algorithms with post quantum variants. However, these studies show that the large public key sizes and computationally intensive processes of these methods slow down the handshake time considerably. This motivates the design of the disclosed system and methods which have overcome these issues.

Authentication/Identity is another issue within modern computer systems that provide service to multiple users and require the ability to accurately identify the user making a request. In traditional systems, the user's identity is verified by checking a password typed during login; the system records the identity and uses it to determine what operations may be performed. The process of verifying the user's identity is called authentication. Password based authentication is not suitable for use on computer networks. Passwords sent across the network can be intercepted and subsequently used by eavesdroppers to impersonate the user. While this vulnerability has been long known, it has been demonstrated on a major scale with the discovery of planted password collecting programs at critical points on the Internet.

Another object of the present disclosed system and methods is to eliminate the issues of Authentication, Integrity, Confidentiality, and Authorization. The disclosed system and methods has provided this solution with a proprietary Authorization mechanism as well as a standards-based Kerberos framework which allows this objective to be realized in a quantum secure environment and use the advanced quantum encryption available with this disclosed system and methods or can be used while associating with non-quantum based standard Kerberos systems.

Another object of the present disclosed system and methods is to eliminate unnecessary steps in the negotiation during the security handshake protocol.

Another object of the present disclosed system and methods is to customize the client/server behavior regarding the elimination of the need for certificates exchange and a trusted Root Authority (CA) that generates self-signed public key use this to distribute signed public/private key pairs down the certificate chain to sub-CAs.

Another object is to create a zero trust and cipher negotiation during Quantum Secure Layer QSL handshake.

Another object of the present disclosed system and methods is to provide a post-quantum secure and backward channel security protocol.

SUMMARY OF THE INVENTION

Various embodiments are directed to addressing the effects of at least one of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

Confidentiality and authentication are two aspects of data privacy protection. Confidentiality pertains to the treatment of information that an individual or entity has disclosed in a relationship of trust and with the expectation that it will not be divulged to others without permission in ways that are inconsistent with the understanding of the original disclosure.

Authentication is the process or action of verifying the identity of a user, process or data. User authentication for each device ensures that the individual using the device is recognized by the company. Authentication provides assurance that data has not been altered in any way after the data is sent or stored. Handshaking is a process/procedure that establishes secure communications between two parties over a computer network. This process has a standards-based method approach with the incorporation of the Kerberos framework as well as proprietary mechanism to accomplish this base issue.

A digital signature used in current Public Key Infrastructure (PKI) implementations consist of public and private key pair received from a Certificate Authority (CA) which can be used to provide confidentiality and authentication during handshaking. However, this process is only secure when the CA is deemed trustworthy.

A shared secret (e.g., a symmetric key) can also be used to provide confidentiality and authentication during handshaking. Unlike a digital signature which requires a CA to be established, a shared secret can be established without a CA. Further, as described herein, a shared secret can provide post-quantum communications security during handshaking with reduced execution time.

Accordingly, the present disclosure provides systems and methods for providing, among other things, signatureless, confidentiality and authentication of data during handshaking in classical and quantum computing environments.

The present disclosure provides a method for secure handshaking for confidentiality and proper authentication, without a certificate authority, and adding continuous random quantum session security key updates to provide at least post-quantum communications security (i.e., PQCS) over a computer network.

The method comprises, with initial communication the generation of a authentication tag, and hashing within the initiator, concatenation of a unique identifier of the initiator and a unique identifier of a recipient.

The method continues, by generating encrypted text which uses symmetrical encryption, by the initiator that is configured to use a shared secret, concatenation of the unique identifier of the initiator, the unique identifier of the recipient, and the authentication tag.

The method further comprises sending the encrypted text from the initiator to a server.

The method also comprises, to generate the unique identifier of the initiator, the unique identifier of the recipient, and a first instance of the authentication tag, symmetrically decrypting, by the server that is configured to use the shared secret, the encrypted text.

The method further comprises authenticating, by the server, the encrypted text. Authenticating the encrypted text comprises, to generate a second instance of the authentication tag, hashing a concatenation of the unique identifier of the initiator and the unique identifier of the recipient. Authenticating the encrypted text further comprises determining that the second instance of the authentication tag matches the first instance of the authentication tag. The method also comprises, responsive to authenticating the encrypted text, generating, by the server, a quantum session key.

The method further includes providing the quantum session key from the server to the initiator.

The present invention also provides a system for handshaking for confidentiality and proper authentication, without a certificate authority, to provide at least post-quantum communications security over a computer network.

The system comprises, in one implementation, an initiator and a server. The initiator is configured to generate an authentication tag by hashing a concatenation of a unique identifier of the initiator and a unique identifier of a recipient. The initiator is also configured to generate an encrypted text by symmetrically encrypting, using a shared secret, a concatenation of the unique identifier of the initiator, the unique identifier of the recipient, and the authentication tag. The server is configured to receive the encrypted text from the initiator. The server is also configured to generate the unique identifier of the initiator, the unique identifier of the recipient, and a first instance of the authentication tag by symmetrically decrypting, using the shared secret, the encrypted text. The server is further configured to authenticate the encrypted text. Authenticating the encrypted text comprises, to generate a second instance of the authentication tag, hashing a concatenation of the unique identifier of the initiator and the unique identifier of the recipient. Authenticating the encrypted text also comprises determining that the second instance of the authentication tag matches the first instance of the authentication tag. The server is also configured to generate, responsive to authenticating the encrypted text, a session key. The server is further configured to provide the session key to the initiator The present invention further provides a method for handshaking, without a certificate authority, to provide at least post-quantum communications security over a computer network. The method comprises, to generate an authentication tag, hashing, by an initiator, a combination of at least a unique identifier of the initiator and a unique identifier of a recipient. The method also comprises, to generate an encrypted text, symmetrically encrypting, by the initiator that is configured to use a shared secret, a combination of at least the unique identifier of the initiator, the unique identifier of the recipient, and the authentication tag. The method further comprises sending the encrypted text from the initiator to a server. The method also comprises, to generate the unique identifier of the initiator, the unique identifier of the recipient, and a first instance of the authentication tag, symmetrically decrypting, by the server that is configured to use the shared secret, the encrypted text. The method further comprises authenticating, by the server, the encrypted text. Authenticating the encrypted text comprises, to generate a second instance of the authentication tag, hashing a combination of the unique identifier of the initiator and the unique identifier of the recipient. Authenticating the encrypted text also comprises determining that the second instance of the authentication tag matches the first instance of the authentication tag. The method also comprises, responsive to authenticating the encrypted text, generating, by the server, a first session key. The method further comprises providing the first session key from the server to the initiator. The method also comprises generating, by the server, a second session key. The method further comprises providing the second session key from the server to the initiator. The providing of the second session key from the server to the initiator is performed prior to a predetermined number of data bytes being encrypted by using the first session key.

Other technical features may be apparent to one skilled in the art from the following figures, descriptions, and claims but not captured in this summary.

BRIEF DESCRIPTION OF THE DRAWINGS

For a more complete understanding of the present disclosure and its advantages, reference is now made to the following description, taken in conjunction with the accompanying drawings. It is emphasized that, according to common practice, the various features of the drawings are not necessarily to-scale. On the contrary, the dimensions of the various features may be and typically are—arbitrarily expanded or reduced for the purpose of clarity.

FIG. 1C is a block diagram of an example structure of a unique identifier dataset, in accordance with some implementations of the present invention.

FIG. 1D is a block diagram of an example structure of a key management service (KMS) dataset, in accordance with some implementations of the present invention.

FIG. 4 is a flow diagram of an example method for exchanging variable length buffers using Authenticated Encryption with Associated Data (AEAD), in accordance with some implementations of the present invention.

FIG. 5A is a flow diagram of an example method for one-to-one quantum security layer (QSL) handshaking, without a certificate authority, to provide at least post-quantum communications security over a computer network, in accordance with some implementations of the present invention.

FIG. 5B is a flow diagram of an example method for one-to-many quantum security layer (QSL) handshaking, without a certificate authority, to provide at least post-quantum communications security over a computer network, in accordance with some implementations of the present invention.

FIG. 6A is a flow diagram of an example method for exchanging a single shared secret via post-quantum Key Encapsulation Mechanism algorithms, in accordance with some implementations of the present invention.

FIG. 6B is a flow diagram of an example method for exchanging multiple shared secrets via post-quantum Key Encapsulation Mechanism algorithms, in accordance with some implementations of the present invention.

FIG. 9 is a flow diagram of an example method for client login to the server after registration has been completed, in accordance with some implementations of the present invention.

DETAILED DESCRIPTION OF ILLUSTRATIVE EMBODIMENTS

Figure 1A:
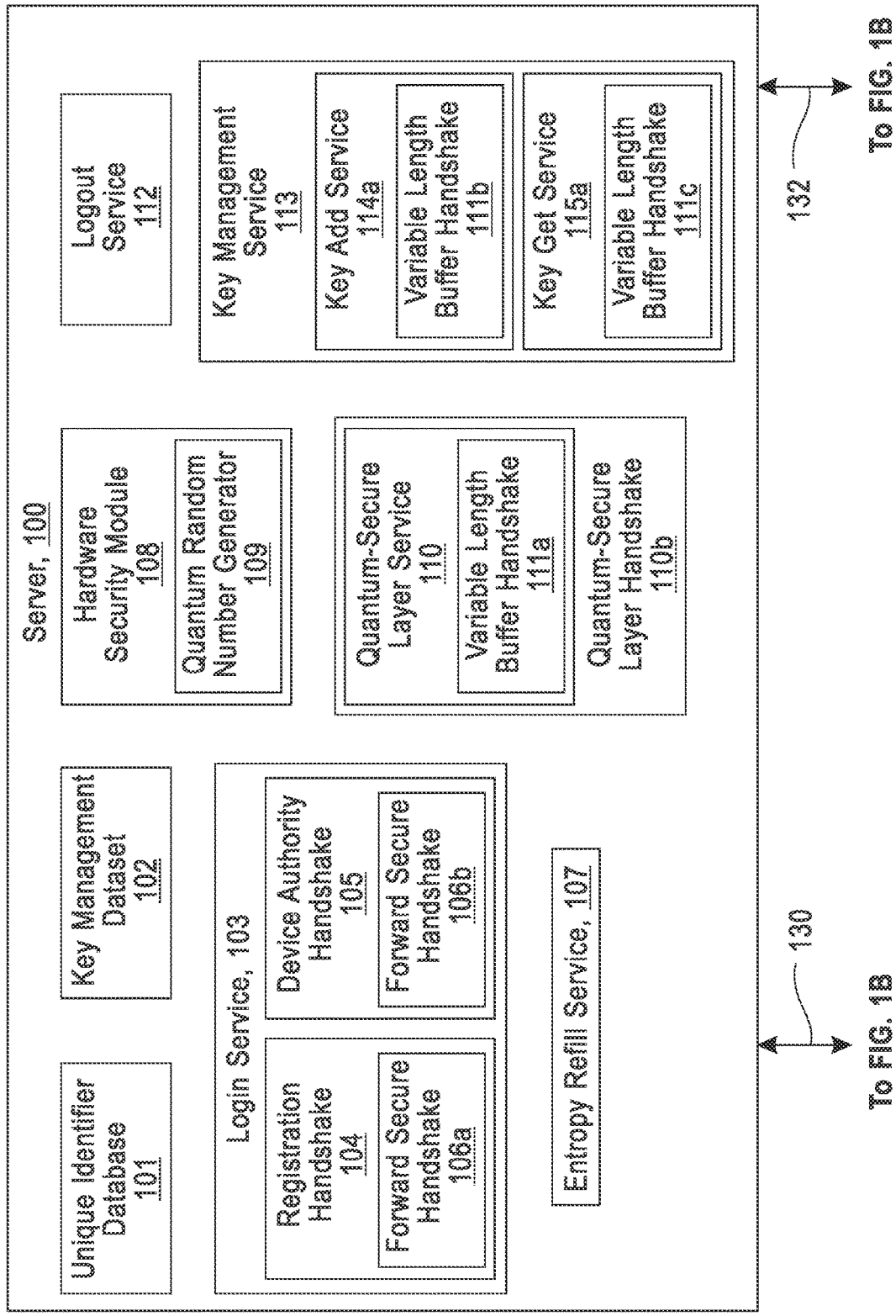
FIG. 1A is a block diagram of an example of a system for handshaking, without a certificate authority, to provide at least post-quantum communications security over a computer network, in accordance with some implementations of the present invention.
Figure 1B:
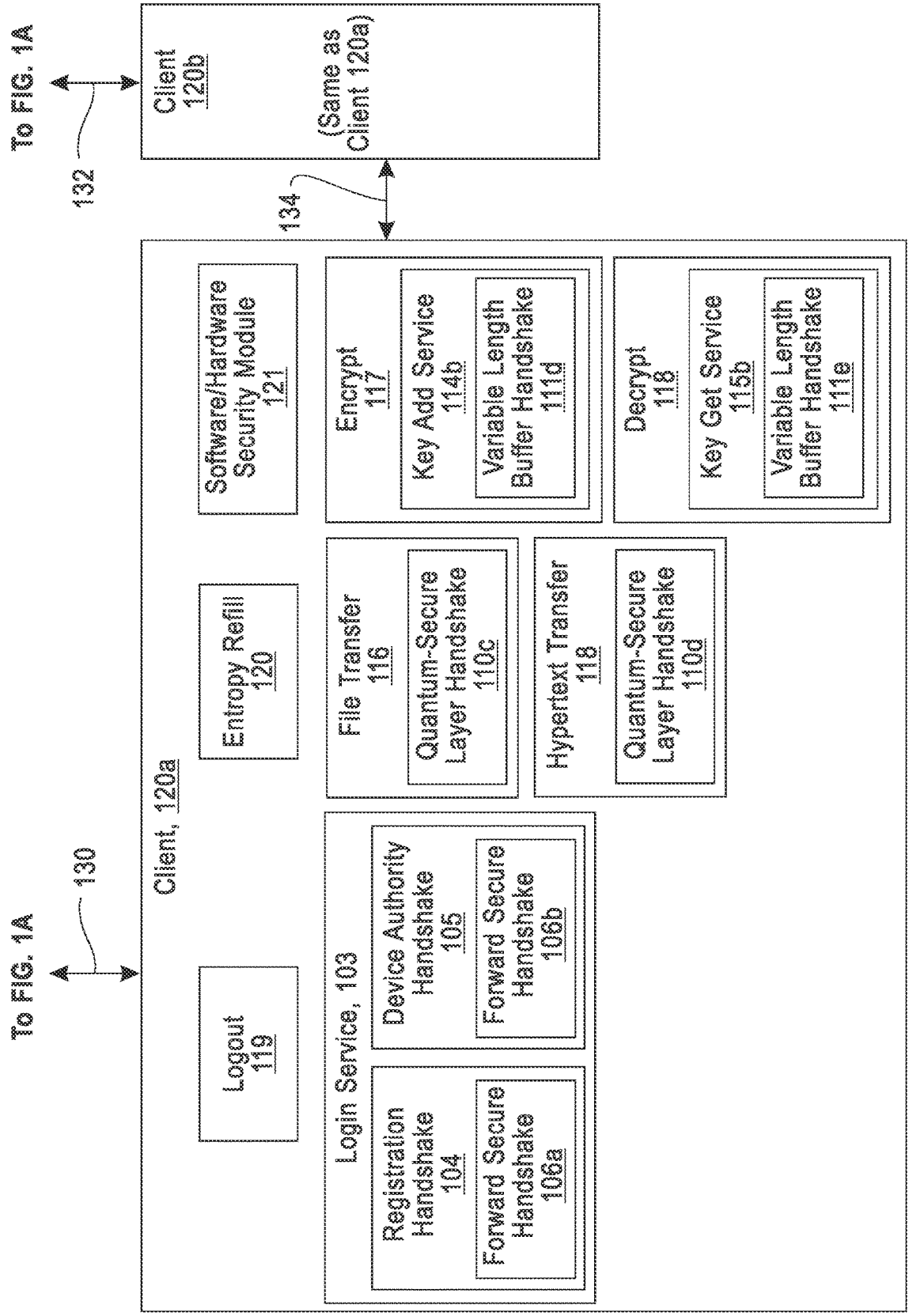
FIG. 1B is a block diagram of an example of the components interacting with the Clients 120*a* and 120*b*, without a certificate authority, to provide at least post-quantum communications security over a computer network, in accordance with some implementations of the present invention.

With reference to FIGS. 1A and 1B, shown a current preferred embodiment of the invention. Within this illustration the aspects as described within this disclosure show the elimination of unnecessary steps in the negotiation during the security handshake protocol. Customize the client/server behavior regarding the elimination of the need for certificate exchange and a trusted Root Certificate Authority (CA) that generates self-signed public key use this to distribute signed public/private key pairs down the certificate chain to sub-CAs. Additionally, to create a zero trust cipher negotiation during QSL handshake and to provide a post-quantum secure and backward channel security protocol.

With reference to FIGS. 1A and 1B a Server 100, a block diagram of an example of a system for handshaking, and components without a certificate authority, to provide at least post-quantum communications security over a computer network. The server 100 includes a server 100, clients 120*a* 120*b*, and a communication networks 130, 132, 134. The Server 100 illustrated in FIG. 1A is provided as one example of such a system. The methods described herein may be used with systems with fewer, additional, or different components in different configurations than the Server 100 illustrated in FIG. 1A. For example, in some implementations, the Server 100 may include additional servers, may include additional or fewer clients, and/or may include more communication networks. Although illustrated as separate components in FIG. 1A, in some implementations, the Server 100 and one or more clients 120*a* and 120*b* may be included in a single electronic device. For example, the Server 100 and the initiator 108 may be included in a single electronic device. As a further example, the Server 100 and the recipient 120*a* or 120*b* may be included in a single electronic device.

Unique Identifier Database and Key Management Database are configured with a static secret key (using a different Key Encapsulation Mechanism (KEM) keypair than is shared with clients) and Services are configured with the corresponding static public key. At system start, the Forward Secrecy Handshake is performed between the Databases and the Services which access those databases—this is repeated periodically (after a number of bytes has been encrypted, for example) to maintain forward secrecy between Databases and Services during runtime. The Databases offload KEM keygen and decapsulation to the HSM, and the relevant Services offload encapsulation to the HSM.

Unique Identifier Dataset FIG. 1C 101 illustrates the current preferred embodiment of the database scheme used to identify a unique entity for communication from the Quantum Secure Layer Service 110. This communication or Data at Rest encryption process uses this structure to complete the handshake as in Quantum Secure Layer Handshake 110*b* for the purpose of encrypting the necessary data and keys between multiple clients 120*a* or 120*b*.

Key Management Dataset FIG. 1D 102 illustrates the current preferred embodiment of the database scheme used to identify elements within the Key Management Service 113 for communication within the Quantum Secure Layer Service 110. The Key Management Dataset 102 FIG. 1D is used to add symmetric keys when requested from other services using Key Add Service 114*a* and to use keys that are in the processes with the Key Get Service 115*a*. Because the Key Management Service 114*a* resides within the Hardware Security Module logic construct an actual "Handle" is used versus the key for better security retrieval.

Hardware Security Module (HSM) FIG. 1A 108 all KEM and cryptographic operations are controlled though the HSM. This component has all cryptographic algorithms and systems logic to avoid security side channel attacks on key pairs or symmetric keys or not limited to other elements requiring vaulting protection. The Hardware Security Module (HSM) 108 controls but not limited to key creation and extraction from the Quantum Random Number Generator 109 and associated storage.

Quantum Random Number Generator (QRNG) FIG. 1A 109 QRNG delivers random numbers for the generation of cryptographic keys and other security parameters, deterministic RNG seeding, initialization vectors, nonces, random challenges, authentication and DSA signing. Other applications include Entropy as a Service (EaaS), simulations, modeling and computer gaming. This generator feeds the cryptographic keys directly into the Hardware Security Module for greater entropy security retrieval. Other outside processes are shielded from this generator. Only protocols that reside within the HSM can access the n-dimensional quantum key source that is produced.

Quantum Secure Layer Service FIG. 1A 110 This component uses the Quantum Secure Layer Handshake 110*b* which is the interaction between key distribution center and client 120*a* or 120*b*. QSL Service 110 is used by the Clients 120*a* and 120*b* to create a secure communications session between the two clients. This supplies the necessary symmetric key by reaching out to the Hardware Security Module (HSM) 108. The interaction between the client peers requests a communication with the necessary unique identifier to establish communications for but not limited to file transfer, messaging, hypertext communications. This service will query all information required from the Unique Identifier Dataset 101 to establish communication this includes but limited to symmetric keys. This follows File Transfer 116 and Hypertext Transfer 118 as it interacts with the Quantum Secure Layer Handshake 110*c* and 110*d* and the Quantum Secure Layer Service 110.

Quantum Secure Layer Handshake FIG. 1A 110*b* This handshake is used to interact with any application with the examples of File Transfer 116 and Hypertext Transfer 118. Any initiating client will have the Unique Identification and the Unique Identification of its recipient to the QSL Server 110 at which time the symmetric session keys will be generated. The QSL Server 110 will encrypt these symmetric keys with post-quantum algorithms used within the Hardware Security Module 108 and the relevant moving target information. Using the recipient clients symmetric key that was established during the Login Service 103 so only the recipient can decrypt that particular portion and then use the symmetric key the initiator established during the Login Service 103 it wishes to communicate with the initiator can decrypt and verifies it came from the Quantum Secure Layer Service 110 once this is completed all symmetric keys will be created and for communication.

Variable Length Buffer Handshake FIG. 1A 111*a*, 111*b*, 111*c*, 111*d*, 111*e* to create a handshake for transferring a buffer of variable length to be used by all services involving a logged-in client, reliant only on Authenticated Encryption with Associated Data (AEAD). All buffers will be stored in RAM, and all parsing will occur in the C language. Each service will have custom functions to format and parse buffers exchanged using the QSL Variable Length Buffer Handshake 111*a*. Summary to exchange any length buffer without knowledge of what size the buffer is going to be. It is sent over length followed by the buffer. To ensure the correct size the recipient has the correct size to read.

Variable Length Buffer Handshake Steps:
1. The initiator sends the length of buffer to the recipient using AEAD
2. The initiator sends the buffer to the recipient using AEAD Login Service FIG. 1A 103 Client authentication, login module on the client would communicate with the login service 103 to authentication. Other components that are contain within this include but not limited to organization onboarding, administration onboarding, and individual clients. FIG. 1A and FIG. 1B represent 2 clients in an organization that communicate to the Server 100. This also implies multi-tenancy communication from client 120*a* and 120*b* to Server 100. An additional component within the Login Service 103 is the Registration Handshake 104 to identify the individual clients to the Server 100. This populates the unique identifier 122 FIG. 1C for the first time within the Server 100. The unique identifier elements and post-quantum token will be passed to the client. Other elements that are captured include items such as, IP address, MAC, routing address.

As part of the registration the client will need to perform the Forward Secrecy Handshake 106*a* and that includes communication with the key encapsulation system of the Server 100 using but not limited to Saber, or Kyber Post Quantum algorithms. These associate a post quantum key pair structure the Server 100 retains the secret key portion of the pair structure. The Client 120*a*, Client 120*b* receives the public key portion and uses said key to establish a shared secret or symmetric key with Server 100. This process then creates a second post quantum key pair derived from the symmetric key and is communicated using the symmetric key to transmit in a protected manner thus reducing the probability of interception of the communication and data. This is unique to each session for data to be compromised the Server 100 secret key and the second symmetric key to get access to the data or session.

Device Authority Handshake FIG. 1A 105 is used when the Client 120*a*, or 120*b* need to log into the system. This is accomplished by using the unique identifier it uses the same Forward Secrecy Handshake 106*b* to establish the client's authentication from the Unique Identifier Dataset 101 FIG. 1C using the post quantum token. The Server 100 and Device Authority Handshake 105 will update the symmetric key of Unique Identifier Dataset 101 FIG. 1C at login for the individual client unique identifiers. In some embodiments, the Registration Handshake and Device Authority Handshake can be configured to generate and share an ephemeral KEM public key with the client at their conclusion. In such an embodiment, the Forward Secrecy Handshake is not needed by the Device Authority Handshake—since the client initiates the handshake with an ephemeral KEM public key. This allows for a login with a reduced number of roundtrips.

Logout Service FIG. 1A 112 FIG. 1B 119 clears the dataset symmetric keys associated with the unique identifier at close of session. Logout 112 or 119 has access to Unique Identifier Dataset 101 associated FIG. 1C. The Logout Service offloads symmetric encryption/decryption to the HSM. The Logout Service pulls in the symmetric key(s) and routing address associated with relevant unique identifiers from Unique Identifier Dataset. The Logout Service may be activated by a lack of a response from the relevant client.

Authentication of clients and establishing a connection between crypto. KEM utilization which give a performance advantage and fewer resources and more efficient. Login, authentication, after established FS handshake.

Entropy Refill Service FIG. 1B 120 is used during high volume communications to replenish the clients 120a or 120b to continue the post-quantum secure communication or Data at Rest process. This data is requested from Quantum Secure Layer Service 110 and Key Management Service 113. The Entropy Refill Service offloads symmetric encryption/decryption to the HSM. The Entropy Refill Service provides bulk entropy from the QRNG to the client to maintain the Client's entropy pool, the advantage allows offline and high-volume key availability. The Entropy Refill Service pulls in the symmetric key(s) and routing address associated with relevant unique identifiers from Unique Identifier Dataset.

Key Management Service FIG. 1A 113 The KMS pulls in the symmetric key(s) and routing address associated with relevant unique identifiers from Unique Identifier Dataset.

Key Add Service FIG. 1A and FIG. 1B 114a, 114b Refresh the entropy pool with the addition of symmetric keys for and encrypted with HSM into the Server 100 database encryption keys system. This data is stored externally but cannot be access without the HSM to decrypt prior to transmittal. The Key Management Dataset FIG. 1D contains the information used in this process Key Get Service FIG. 1A and FIG. 1B 115a, 115b reaches out to HSM to get keys get decrypted key from database.

Entropy Refill FIG. 1B 120 The Entropy Refill Service offloads symmetric encryption/decryption to the HSM. The Entropy Refill Service provides bulk entropy from the QRNG to the client to maintain the Client's entropy pool. The Entropy Refill Service pulls in the symmetric key(s) and routing address associated with relevant unique identifiers from Unique Identifier Dataset.

File Transfer FIG. 1B 116 File Transfer uses the QSL Handshake to receive session keys from the QSL Service for a secure connection with a peer. File Transfer then utilizes the functions provided by the QuSecure QSL Library (libqsl) for the QSL equivalent of the TLS Record Protocol. Symmetric encryption/decryption (AEAD) is offloaded to the S/HSM.

HyperText Transfer FIG. 1B 118 Hypertext Transfer uses the QSL Handshake to receive session keys from the QSL Service for a secure connection with a peer. Hypertext Transfer then utilizes the functions provided by the QuSecure QSL Library (libqsl) for the QSL equivalent of the TLS Record Protocol. Symmetric encryption/decryption (AEAD) is offloaded to the S/HSM.

Encrypt FIG. 1B 117 Encrypt (Data-At-Rest) utilizes Key Add to reach out to the Key Management Service, specifically the Key Add Service to get encryption keys. Encrypt encrypts the data using the Moving Target Design to switch between encryption keys. Symmetric encryption (AEAD) is offloaded to the S/HSM.

Key Add Service 114b Refresh the entropy pool with the addition of symmetric keys for and encrypted with HSM into the Server 100 database encryption keys system. This data is stored externally but cannot be accessed without the HSM to decrypt prior to transmittal. The Key Management Dataset FIG. 1D contains the information used in this process Decrypt FIG. 1B 118 Decrypt (Data-At-Rest) utilizes Key Get to reach out to the Key Management Service, specifically the Key Get Service to get decryption keys. Decrypt decrypts the data using the Moving Target Design to switch between decryption keys. Symmetric decryption (ADAD) is offloaded to the S/HSM.

Key Get reaches out to HSM to get keys get decrypted key from database.

Unique Identifier Dataset FIG. 1C 122, Unique Identifier Database and Key Management Database FIG. 1D 126 are configured with a static secret key (using a different KEM keypair than is shared with clients) and Services are configured with the corresponding static public key. At system start, the Forward Secrecy Handshake is performed between the Databases and the Services which access those databases—this is repeated periodically (after a number of bytes has been encrypted, for example) to maintain forward secrecy between Databases and Services during runtime. The Databases offload KEM keygen and decapsulation to the HSM, and the relevant Services offload encapsulation to the HSM. In some embodiments, the Registration Handshake and Device Authority Handshake can be configured to generate and share an ephemeral KEM public key with the client at their conclusion. In such an embodiment, the Forward Secrecy Handshake is not needed by the Device Authority Handshake—since the client initiates the handshake with an ephemeral KEM public key. This allows for a login with a reduced number of roundtrips. These structures are listed but not limited to the fields to achieve the described functionality for the preferred embodiment.

Figure 2:
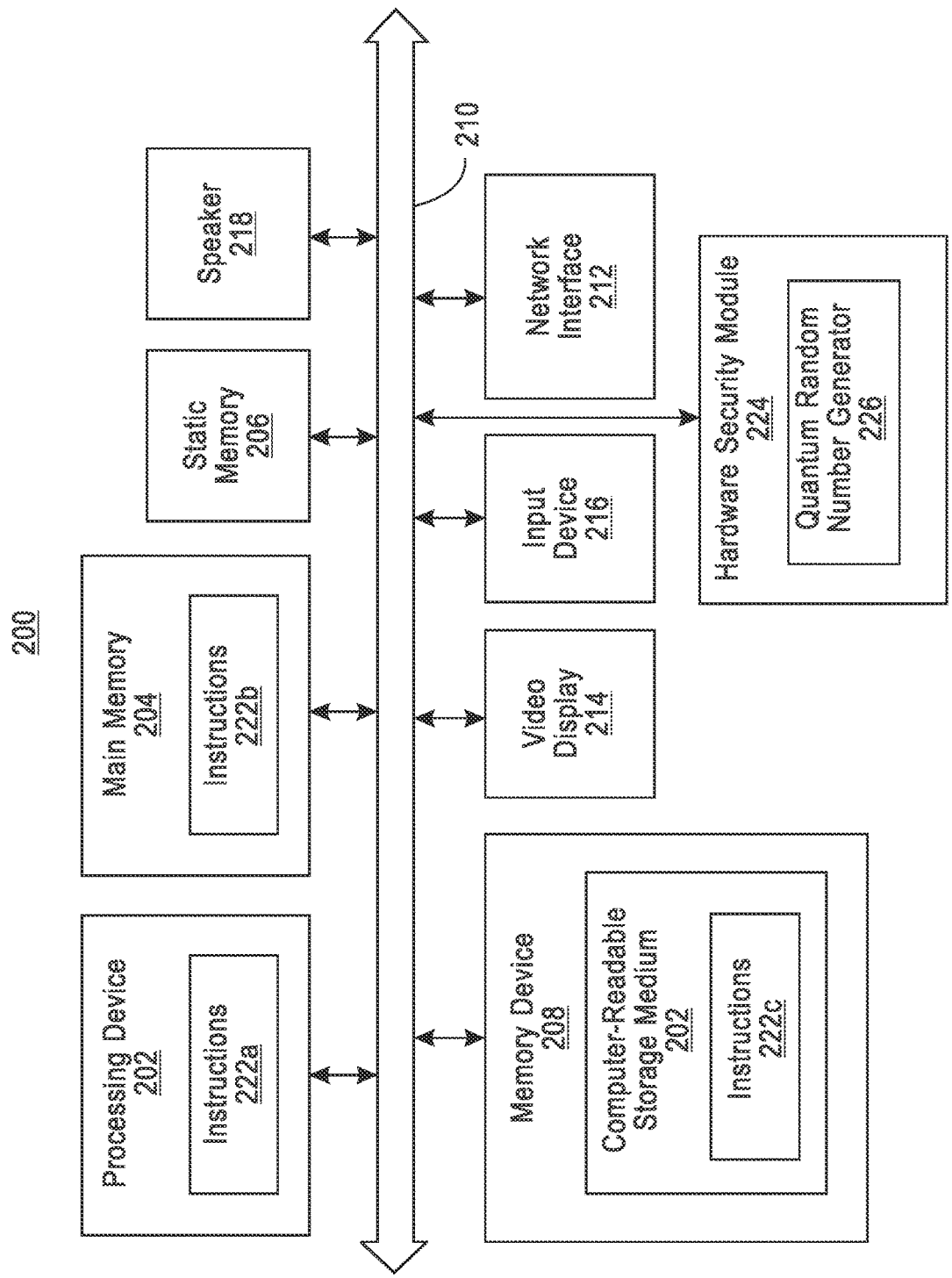
FIG. 2 is a block diagram of an example of a computer system, in accordance with some implementations of the present invention.

FIG. 2 is a block diagram of an example computer system 200 which can perform any one or more of the methods described herein, in accordance with one or more aspects of the present disclosure. In one example, the computer system 200 may include a computing device and correspond to one or more of the servers 100, the client 120a, 120b, or any suitable component of FIG. 1A. The computer system 200 may be connected (e.g., networked) to other computer systems in a local area network (LAN), an intranet, an extranet, or the Internet, including via the cloud or a peer-to-peer network. The computer system 200 may operate in the capacity of a server in a client-server network environment. The computer system 200 may be a personal computer (PC), a tablet computer, a wearable (e.g., wristband), a set-top box (STB), a personal Digital Assistant (PDA), a mobile phone, a smartphone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 200 (one example of a "computing device") illustrated in FIG. 2 includes a processing device 202, a main memory 204 (e.g., read-only memory (ROM), flash memory, solid state drives (SSDs), dynamic random access memory (DRAM) such as synchronous DRAM (SDRAM)), a static memory 206 (e.g., flash memory, solid state drives (SSDs), or static random access memory (SRAM)), and a memory device 208, wherein any of the foregoing may communicate with each other via a bus 210. In some implementations, the computer system 200 may further include a hardware security module (not shown).

The processing device 202 represents one or more general-purpose processing devices such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 202 may also be one or more special-purpose processing devices such as an application specific integrated circuit (ASIC), a system on a chip, a field programmable gate array (FPGA), a digital signal processor (DSP), network processor, or the like. The processing device 202 may be configured to execute instructions for performing any of the operations and steps discussed herein.

The computer system 200 illustrated in FIG. 4 further includes a network interface device 212. The computer system 200 also may include a video display 214 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 216 (e.g., a keyboard and/or a mouse or a gaming-like control), and one or more speakers 218 (e.g., a speaker). In one illustrative example, the video display 214 and the one or more input devices 216 may be combined into a single component or device (e.g., an LCD touchscreen).

The memory device 208 may include a computer-readable storage medium 202 on which the instructions 222*c* embodying any one or more of the methods, operations, or functions described herein are stored. The instructions 222*c* may also reside, completely or at least partially, within the main memory 204 as instructions 222*b* and/or within the processing device 202 during execution thereof by the computer system 200. As such, the main memory 204 or as instruction 222*a* and the processing device 202 also constitute computer-readable media. The instructions 222 may further be transmitted or received over a network via the network interface device 212.

While the computer-readable storage medium 220 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methods disclosed herein. The term "computer-readable storage medium" shall accordingly be taken to include, but not be limited to, solid-state memories, optical media, and magnetic media.

While the computer system environment of 200 shows the basic components the addition of a Hardware Security Module 224 associated with a Quantum Random Number Generator 226 are added to complete the entropy required for Post Quantum computations and interactions. The use of these components is critical as described previously in the overall methods used for this system.

Figure 3A:
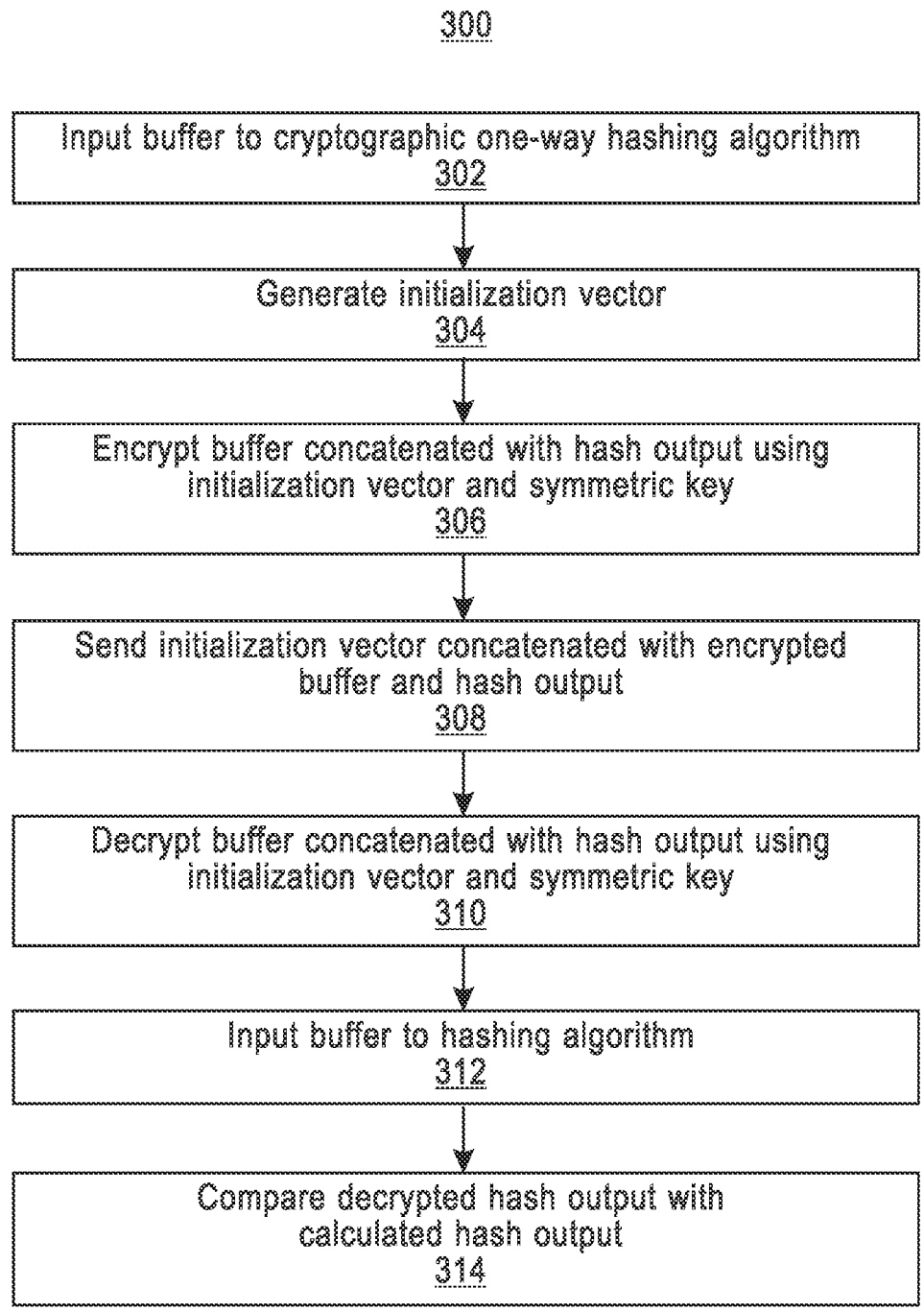
FIG. 3A is a flow diagram of an example method for Authenticated Encryption with Associated Data using the Hash-then-Encrypt method, in accordance with some implementations of the present invention.

FIG. 3A Hash Then Encrypt AEAD 300 A method of Authenticated Encryption with Associated Data following the Hash-then-Encrypt framework. Associated data may be concatenated to the buffer and input to the cryptographic one-way hashing algorithm. The unencrypted associated data can then be concatenated with the initialization vector and encrypted buffer. The initialization vector determines the initial state of the symmetric encryption algorithm. Illustrates the sequence required to establish an Encrypted and Decrypted element. This method is 1 of 2 that will be presented as part of this systems use. At block 302, the input buffer that is in process will be presented to a one-way cryptographic hashing algorithm to begin the encryption process of this data. Block 304 generates the initialization vector that is used within the forward calculations. At Block 306 the elements listed are merged together with the protected symmetric key to create the encrypted payload. At Block 308 the said payload is then transmitted to the receiving client. Block 310-314 reverses the process with the same protected symmetric key and initialization vector for decrypting the data.

Figure 3B:
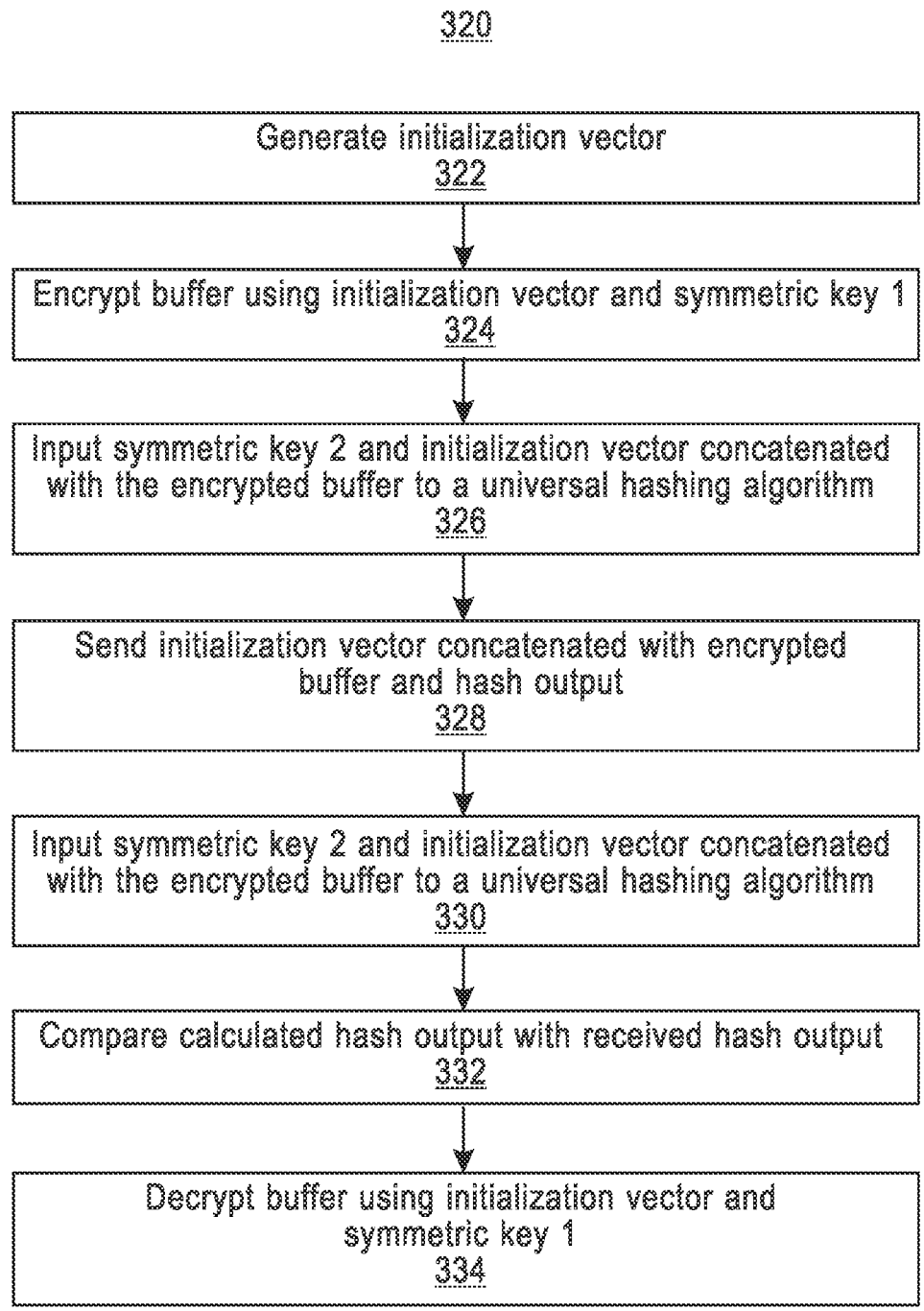
FIG. 3B is a flow diagram of an example method for Authenticated Encryption with Associated Data using the Encrypt-then-Hash method, in accordance with some implementations of the present invention.

FIG. 3B Encrypt Then Hash AEAD 320 A method of Authenticated Encryption with Associated Data following the Encrypt-then-Hash framework. Associated data may be concatenated to the initialization vector and encrypted buffer before it is input to the universal hashing algorithm. The unencrypted associated data can then be concatenated with the initialization vector, encrypted buffer, and hash output. The initialization vector determines the initial state of the symmetric encryption algorithm. The sequence for this differs from FIG. 3A by generating the initialization vector 322. In block 324 the payload is encrypted using the first symmetric key and but not limited to AES-256 variants with the protected post quantum symmetric key (key1) and the initialization vector. Block 326 uses the second symmetric key (key 2) which creates the Hash of the now encrypted data thus creating a higher level of protection for transmission, but this is limited only symmetric key1 or symmetric key 2. The server generating a symmetric key can be updated by the server generating multiple symmetric keys and the server generating the maximum number of bytes each symmetric key may be used to encrypt; the clients switch to the next symmetric key prior to the current symmetric key encrypting the maximum number of bytes. Blocks 330-334 reverse the sequence to end with the data decrypted.

FIG. 4 Variable Length Buffer Handshake 400 The Variable Length Buffer Handshake is used to communicate a buffer of variable length between two parties. AEAD 402 is used to provide confidentiality and integrity of data. First the length of the buffer is sent by an initiator, then the buffer itself is sent by the initiator 404. The use of the FIG. 3B or FIG. 3A sequence with a variable length buffer to prevent overflow or underflow errors and attacks.

FIG. 5A One to One QSL Handshake 500 The one-to-one QSL Handshake provides an initiator with the necessary key material to establish a secure connection with one peer. The handshake may follow the Moving Target Design to switch between encryption keys. The initiator can forward the encrypted text from step 506 to the peer to initiate the secure connection. AEAD (Authenticated Encryption, Authenticated Decryption) Block 502 begins the initiation of a communication with a one to one or peer relationship. Block 504 requests and generates a session key that the one-to-one communications will use to begin the communication in this system this session key is a direct result of the Quantum Random Number Generator or a Quantum Value as the session key. This is shared between and use for the encryption as in block 508.

FIG. 5B One to Many QSL Handshake 510 The one-to-many QSL Handshake provides an initiator with the necessary key material to establish a secure connection with multiple peers. The handshake may follow the Moving Target Design to switch between encryption keys. The initiator can forward the encrypted texts from step 516 to each peer to initiate the secure connection. In block 512 this is the initiation of multiple recipients to one. Block 514 creates a Quantum Random Number Generated session key that is distributed to each of the recipients. Block 516 the server encrypts the initiators unique identifier with the other attributes listed. Block 518 once this process is complete another step-in encryption to the recipients is sent for the establishment of the connection.

FIG. 6A Single Key Exchange 600 The exchange of a single shared secret using a Key Encapsulation Mechanism. The initiator encapsulates the shared secret using a public key, creating a ciphertext. The recipient decapsulates the ciphertext to produce the shared secret using a secret key. Block 602 initiates the single key and shared secret this invokes block 604 to send the ciphertext to server. Block 606 a Post Quantum key pair is created and used to transmit the ciphertext and Quantum Session key.

FIG. 6B Double Key Exchange 610 The exchange of a multiple shared secrets using a Key Encapsulation Mechanism. The initiator encapsulates the two shared secrets using a public key, creating a two ciphertexts. The recipient decapsulates the two ciphertext to produce two shared secrets using a secret key. Blocks 612-620 allow for double the key exchange as from FIG. 6A.

Figure 6C:
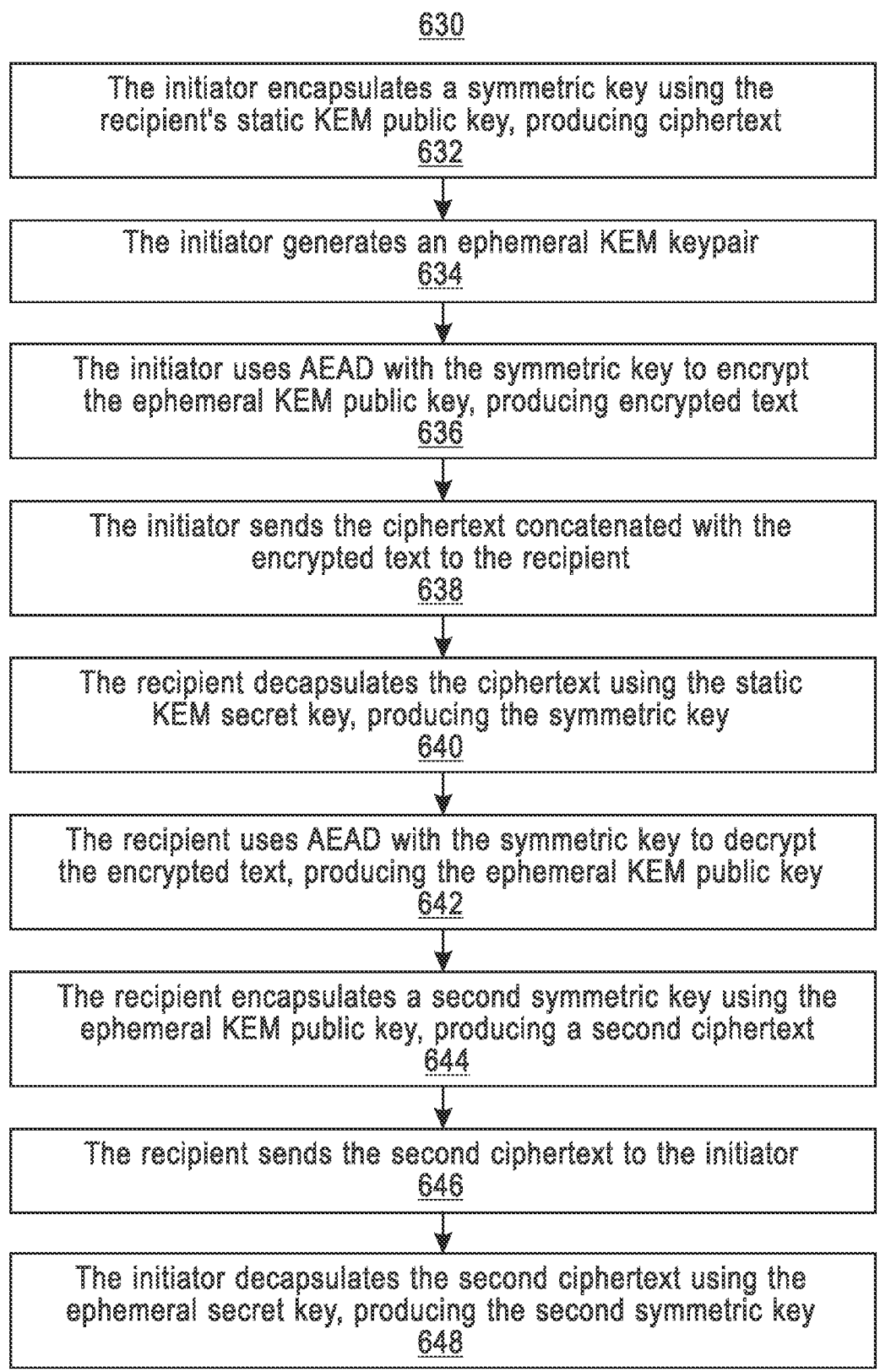
FIG. 6C is a flow diagram of an example method providing forward secrecy via post-quantum Key Encapsulation Mechanism algorithms, in accordance with some implementations of the present invention.

FIG. 6C Forward Secrecy Handshake 630 The Forward Secrecy Handshake allows two parties to establish forward secrecy using Key Encapsulation Mechanisms. The first shared secret is exchanged using a static KEM keypair. The shared secret is then used to exchange an ephemeral KEM keypair, which is used to establish a second shared secret. The second shared secret is not vulnerable if the long-term secret, the static KEM key pair, is compromised. Block 632-648 show a sequence of establishing proper secrecy novel and highly protective.

Figure 7:
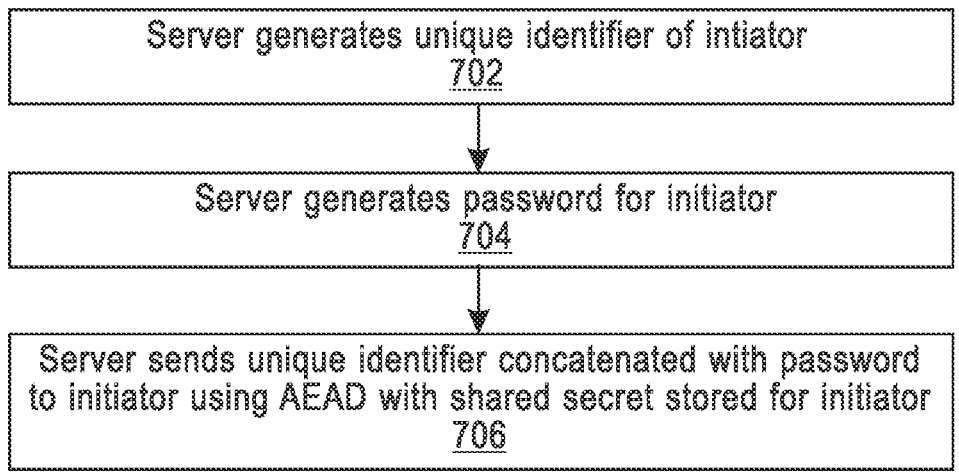
FIG. 7 is a flow diagram of an example method providing client registration with the server, in accordance with some implementations of the present disclosure.

FIG. 7 Registration 700 A method for client registration. The server generates a unique identifier and post-quantum password for the client and sends this information to the client using AEAD. This exchange occurs after the Forward Secrecy Handshake has been performed. Block 702-706 using the previous sequences establishes the client registration as valid per unique identifier. Namely, the server generates unique identifier of initiator 702, then the server generates password for initiator 704 and finally, the server sends the unique identifier concatenated with the password to the initiator using AEAD with the shared secret stored for initiator 706.

Figure 8:
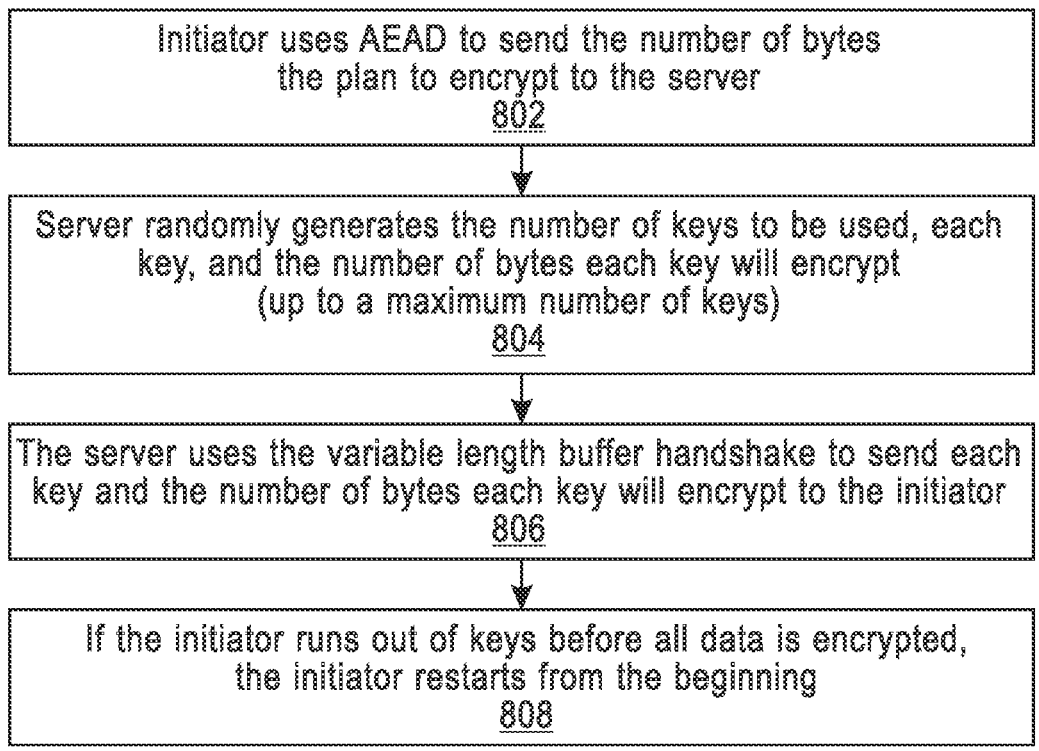
FIG. 8 is a flow diagram of an example method for alternating between session keys following a Moving Target design, in accordance with some implementations of the present invention.

FIG. 8 Moving Target 800 The Moving Target Design provides a method for injecting new key material into an existing session, as well as a method to switch between encryption keys. The keys and the number of bytes each key will encrypt is determined by the server and is transferred to the client using the Variable Length Buffer Handshake. This process 800 starts by having the initiator uses AEAD to send the number of bytes in the plan to encrypt to the server 802. Then the server randomly generates the number of keys to be used, each key, and the number of bytes each key will encrypt 804. The server then uses the variable length buffer handshake to send each key and the number of bytes each key will encrypt to the initiator 806. The process then determines if the initiator runs of keys before all of data is encrypted, initiator restart from the beginning, 808.

FIG. 9 Device Authority 900 A method for client login. The client sends their unique identifier and post-quantum password to the server for verification using AEAD.

What is claimed:

1. A method comprises:
providing direct communication between a server and an initiator client, indirect communication between the server and a recipient client, and direct communication between the initiator client and the recipient client;
providing mutual identity authentication; and
providing forward secrecy, confidentiality of data, and integrity of data comprising:
the initiator client encapsulating a first shared secret using a static Key Encapsulation Mechanism (KEM) public key to produce a first ciphertext;
the initiator client sending the first ciphertext to the server;
the initiator client generating an ephemeral KEM keypair;
the initiator client sending the ephemeral KEM public key to the server using an Authenticated Encryption with Associated Data (AEAD) with the first shared secret;
the server decapsulating the first ciphertext using the static KEM private key to produce the first shared secret;
the server encapsulating a second shared secret using the ephemeral KEM public key to produce a second ciphertext;
the server sending the second ciphertext to the initiator client;
the initiator client decapsulating the second ciphertext using the ephemeral KEM private key to produce the second shared secret;
the server generating a plurality of symmetric session keys, wherein each symmetric session key is updated by the server and the server generating a number of bytes each one of the symmetric session keys used to encrypt;
clients switching to a next symmetric session key prior to a current symmetric session key encrypting a predetermined number of bytes associated with the current symmetric session key; and
the initiator client forwarding an encrypted buffer generated by the server to the recipient client to establish a secure session.

2. The method of claim 1, further comprising: the initiator client sending a unique identifier of the recipient client to the server using AEAD with the second shared secret shared with the server;
the server generating a symmetric session key;
the server encrypting a unique identifier of the initiator client, routing address of the initiator client, and the generated symmetric session key using AEAD with a recipient client's symmetric key to produce the encrypted buffer;
the server sending a routing address of the recipient client, the generated symmetric session key, and the encrypted buffer to the initiator client using AEAD with the second shared secret shared with the initiator client.

3. The method of claim 1, wherein there is indirect communication between the server and multiple recipient clients and there is direct communication between the initiator client and multiple recipient clients.

4. The method of claim 3 further comprising:
the initiator client sending a unique identifier of each recipient client of a plurality of recipient clients to the server using AEAD with the second shared secret shared with the server;
the server generating a symmetric session key for each recipient client;
for each recipient client, the server encrypting a unique identifier of the initiator client,
routing address of the initiator client, and the generated symmetric session key using AEAD with each recipient client's symmetric key to produce the encrypted buffer;
for each recipient client, the server sending routing address of the recipient client, the generated symmetric session key, and the encrypted buffer to the initiator client using AEAD with the second shared secret shared with the initiator client;
the initiator client forwarding the encrypted buffer to each recipient client to establish a secure session.

5. The method of claim 1, wherein further there is direct communication between the server and the recipient client.

6. The method of claim 5, further comprising:
the initiator client sending a unique identifier of the recipient client to the server using AEAD with the second shared secret shared with the server;
the server generating a symmetric session key;
the server sending a unique identifier of the initiator client, routing address of the initiator client, and the generated symmetric session key to the recipient client using AEAD with a recipient client's symmetric key;
the server sending a routing address of the recipient client and the generated symmetric session key to the initiator client using AEAD with the second shared secret shared with the initiator client;
the initiator client establishing a secure session with the recipient client.

7. The method of claim 6, wherein the server sending the routing address of the recipient client and the generated symmetric session key to the initiator client using AEAD with the second shared secret shared with the initiator client;
the server sending the unique identifier of the initiator client, the routing address of the initiator client, and the generated symmetric session key to the recipient client using AEAD with the recipient client's symmetric key.

8. The method of claim 1, wherein there is direct communication between the server and multiple recipient clients and there is direct communication between the initiator client and the multiple recipient clients.

9. The method of claim 8, further comprising:
the initiator client sending a unique identifier of each recipient client of a plurality of recipient clients to the server using AEAD with the second shared secret shared with the server;
the server generating a symmetric session key for each recipient client;
for each recipient client, the server sending a unique identifier of the initiator client, routing address of the initiator client, and the generated symmetric session key to the recipient client using AEAD with each recipient client's symmetric key;
for each recipient client, the server sending the routing address of the recipient client, the generated symmetric session key, and the encrypted buffer to the initiator client using AEAD with the second shared secret shared with the initiator client;
the initiator client establishing a secure session with each recipient client.

10. The method of claim 9, wherein for each recipient client, the server sending the routing address of the recipient client, the generated symmetric session key, and the encrypted buffer using AEAD with the second shared secret shared with the initiator client;
for each recipient client, the server sending the unique identifier of the initiator client, the routing address of the initiator client, and the generated symmetric session key to the recipient client using AEAD with each recipient client's symmetric key.

11. The method of claim 2, wherein the server generates number of bytes the symmetric session key used to encrypt, and the symmetric session key is a first symmetric session key;
wherein the method further comprises: generating, by the server, a second symmetric session key and the number of bytes the second symmetric session key used to encrypt;
the initiator client requests the second symmetric session key from the server prior to the first symmetric session key encrypting the number of bytes associated with the first symmetric session key.

12. The method of claim 4, wherein for each recipient client, the server generating the number of bytes the symmetric session key may be used to encrypt, and the symmetric session key is a first symmetric session key;
wherein the method further comprises: for each recipient client, generating, by the server, a second symmetric session key and the number of bytes the second symmetric session key may be used to encrypt; the initiator client requests the second symmetric session key from the server prior to the first symmetric session key encrypting the number of bytes associated with the first symmetric session key.

13. The method of claim 6, wherein the server generating the number of bytes the generated symmetric session key used to encrypt, and the symmetric session key is a first symmetric session key; wherein the method further comprises: the server generating a second symmetric session key and the number of bytes the second symmetric session key may be used to encrypt; the initiator client requests the second symmetric session key from the server prior to the first symmetric session key encrypting the number of bytes associated with the first symmetric session key.

14. The method of claim 9, wherein for each recipient client, the server generating an number of bytes the symmetric session key may be used to encrypt, and the symmetric session key is a first symmetric session key;
wherein the method further comprises: for each recipient client, the server generating a second symmetric session key and an number of bytes the second symmetric session key may be used to encrypt; the initiator client requests the second symmetric session key from the server prior to the first symmetric session key encrypting the number of bytes associated with the first symmetric session key.

15. The method of claim 11, wherein providing of the second generated symmetric session key from the server to the initiator client is performed after a server-generated period of time following providing of the first symmetric session key to the initiator client.

16. The method of claim 12, wherein providing of the second generated symmetric session key(s) from the server to the initiator client is performed after a server-generated period of time following providing of the first symmetric session key(s) to the initiator client.

17. The method of claim 13, wherein providing of the second generated symmetric session key from the server to the initiator client is performed after a server-generated period of time following providing of the first symmetric session key to the initiator client.

18. The method of claim 14, wherein providing of the second generated symmetric session key(s) from the server to the initiator client is performed after a server-generated period of time following providing of the first symmetric session key(s) to the initiator client.

19. The method of claim 2, wherein the generated symmetric session key comprises a post-quantum level of security, and wherein the server generates the symmetric session key with a random number generator.

20. The method of claim 4, wherein the symmetric session key comprises a post-quantum level of security, and wherein the server generates the symmetric session key with a random number generator.

21. The method of claim 6, wherein the symmetric session key comprises a post-quantum level of security, and wherein the server generates the symmetric session key with a random number generator.

22. The method of claim 7, wherein the symmetric session key comprises a post-quantum level of security, and wherein the server generates the symmetric session key with a random number generator.

23. The method of claim 9, wherein the symmetric session key comprises a post-quantum level of security, and wherein the server generates the symmetric session key with a random number generator.

24. The method of claim 10, wherein the symmetric session key comprises a post-quantum level of security, and wherein the server generates the symmetric session key with a random number generator.

25. The method of claim 11, wherein the symmetric session key comprises a post-quantum level of security, and wherein the server generates the symmetric session key with a random number generator.

26. The method of claim 12, wherein the symmetric session key comprises a post-quantum level of security, and wherein the server generates the symmetric session key with a random number generator.

27. The method of claim 13, wherein the symmetric session key comprises a post-quantum level of security, and wherein the server generates the symmetric session key with a random number generator.

28. The method of claim 14, wherein the symmetric session key comprises a post-quantum level of security, and wherein the server generates the symmetric session key with a random number generator.

29. A server computer system comprising a memory and at least one processor coupled to the memory, wherein the server computer system is configured to:
provide direct communication between the server computer system and an initiator client, provide indirect communication between the server computer system and a recipient client, and facilitate direct communication between the initiator client and the recipient client;
provide mutual identity authentication; and
provide forward secrecy, confidentiality of data, and integrity of data;
the initiator client is configured to:
encapsulate a first shared secret using a static Key Encapsulation Mechanism (KEM) public key to produce a first ciphertext;
send the first ciphertext to the server computer system;
generate an ephemeral KEM keypair;
send the ephemeral KEM public key to the server computer system using an Authenticated Encryption with Associated Data (AEAD) with the first shared secret;
forward an encrypted buffer generated by the server computer system to the recipient client to establish a secure session;
at least one processor of the server computer system is configured to execute instructions to:
decapsulate the first ciphertext using the static KEM private key to produce the first shared secret;
encapsulate a second shared secret using the ephemeral KEM public key to produce a second ciphertext; and
send the second ciphertext to the initiator client;
the initiator client is further configured to decapsulate the second ciphertext using the ephemeral KEM secret key to produce the second shared secret; and
wherein:
the server computer system generating a plurality of symmetric session keys, wherein each symmetric session key is updated by the server computer system and the server computer system generating a number of bytes each symmetric session key used to encrypt; and clients are further configured to switch to a next symmetric session key prior to a current symmetric session key encrypting a predetermined number of bytes associated with the current symmetric session key.

30. The server computer system of claim 29, wherein: the initiator client is configured to send a unique identifier of a recipient client to the server computer system using AEAD with the second shared secret shared with the server computer system; the at least one processor of the server computer system is further configured to execute instructions to generate a symmetric session key;
the at least one processor of the server computer system is further configured to execute instructions to encrypt a unique identifier of the initiator client, routing address of the initiator client, and the generated symmetric session key using AEAD with a recipient client's symmetric key to produce the encrypted buffer;
the at least one processor of the server computer system is further configured to execute instructions to send the routing address of the recipient client, the generated symmetric session key, and the encrypted buffer to the initiator client using AEAD with the second shared secret shared with the initiator client.

31. The server computer system of claim 29, wherein there is indirect communication between the server computer system and multiple recipient clients and there is direct communication between the initiator client and multiple recipient clients.

32. The server computer system of claim 31, wherein: the initiator client is configured to send a unique identifier of each recipient client of a plurality of recipient clients to the server computer system using AEAD with the second shared secret shared with the server computer system;
the at least one processor of the server computer system is further configured to execute instructions to:
generate a symmetric session key for each recipient client;

for each recipient client, encrypt a unique identifier of the initiator client, a routing address of the initiator client, and the generated symmetric session key using AEAD with each recipient client's symmetric key to produce the encrypted buffer;

and for each recipient client, send routing address of the recipient client, the generated symmetric session key, and the encrypted buffer to the initiator client using AEAD with the second shared secret shared with the initiator client; and the initiator client is further configured to forward the encrypted buffer to each recipient client to establish a secure session.

33. The server computer system of claim 29, wherein further there is direct communication between the server computer system and a recipient client.

34. The server computer system of claim 33, wherein:
the initiator client is further configured to send a unique identifier of the recipient client to the server computer system using AEAD with the second shared secret a shared with the server computer system;
the at least one processor of the server computer system is further configured to execute instructions to:
generate a symmetric session key;
send a unique identifier of the initiator client, routing address of the initiator client, and the generated symmetric session key to the recipient client using AEAD with the recipient client's symmetric key; and
send routing address of the recipient client and the generated symmetric session key to the initiator client using AEAD with the second shared secret shared with the initiator client; and the initiator client is further configured to establish a secure session with the recipient client.

35. The server computer system of claim 34, wherein the at least one processor of the server computer system is further configured to execute instructions to:
send the routing address of the recipient client and the generated symmetric session key to the initiator client using AEAD with the second shared secret shared with the initiator client; and send the unique identifier of the initiator client, the routing address of the initiator client, and the generated symmetric session key to the recipient client using AEAD with the recipient client's symmetric key.

36. The server computer system of claim 29, wherein there is direct communication between the server computer system and multiple recipient clients and there is direct communication between the initiator client and the multiple recipient clients.

37. The server computer system of claim 36, wherein: the initiator client is further configured to send a unique identifier of each recipient client of a plurality of recipient clients to the server computer system using AEAD with the second shared secret shared with the server computer system;
the at least one processor of the server computer system is further configured to execute instructions to:
generate a symmetric session key for each recipient client;
for each recipient client, send a unique identifier of the initiator client, routing address of the initiator client, and the generated symmetric session key to the recipient client using AEAD with each recipient client's symmetric key;
for each recipient client, send routing address of the recipient client, the generated symmetric session key, and the encrypted buffer using AEAD with the second shared secret shared with the initiator client; and the initiator client is further configured to establish a secure session with each recipient client.

38. The server computer system of claim 37, wherein for each recipient client, the at least one processor of the server computer system is further configured to execute instructions to:
send the routing address of the recipient client, the generated symmetric session key, and the encrypted buffer to the initiator client using AEAD with the second shared secret shared with the initiator client; and
send the unique identifier of the initiator client, the routing address of the initiator client, and the generated symmetric session key to the recipient client using AEAD with each recipient client's symmetric key.

39. The server computer system of claim 30, wherein: the at least one processor of the server computer system is further configured to execute instructions to:
generate the number of bytes the symmetric session key used to encrypt, wherein the symmetric session key is a first symmetric session key; and
generate a second symmetric session key and a number of bytes the second symmetric session key used to encrypt; and
the initiator client is further configured to request the second symmetric session key from the server computer system prior to the first symmetric session key encrypting the number of bytes associated with the first symmetric session key.

40. The server computer system of claim 32, wherein for each recipient client, the at least one processor of the server computer system is further configured to execute instructions to:
generate the number of bytes the symmetric session key used to encrypt, and the symmetric session key is a first symmetric session key;
generate a second symmetric session key and a number of bytes the second symmetric session key used to encrypt;
the initiator client is further configured to request the second symmetric session key from the server computer system prior to the first symmetric session key encrypting the number of bytes associated with the first symmetric session key.

41. The server computer system of claim 34, wherein: the at least one processor of the server computer system is further configured to execute instructions to:
generate the number of bytes the symmetric session key may be used to encrypt, wherein the symmetric session key is a first symmetric session key;
generate a second symmetric session key and a number of bytes the second symmetric session key used to encrypt;
the initiator client is further configured to request the second symmetric session key from the server computer system prior to the first symmetric session key encrypting the number of bytes associated with the first symmetric session key.

42. The server computer system of claim 37, wherein: for each recipient client, the at least one processor of the server computer system is further configured to execute instructions to:
generate the number of bytes the symmetric session key used to encrypt, wherein the symmetric session key is a first symmetric session key; and generate a second symmetric session key and a number of bytes the second symmetric session key used to encrypt;

the initiator client is further configured to request the second symmetric session key from the server computer system prior to the first symmetric session key encrypting the number of bytes associated with the first symmetric session key.

43. The server computer system of claim 38, wherein providing of the second generated symmetric session key(s) from the server computer system to the initiator client is performed after a server-generated period of time following providing of the first symmetric session key to the initiator client.

44. The server computer system of claim 39, wherein providing of the second generated symmetric session key from the server computer system to the initiator client is performed after a server-generated period of time following providing of the first symmetric session key to the initiator client.

45. The server computer system of claim 40, wherein for each recipient client:
the server computer system generating a symmetric session key is updated by the server computer system generating multiple symmetric session keys and the server computer system generating a number of bytes each symmetric session key used to encrypt;
the clients are further configured to switch to a next symmetric session key prior to a current symmetric session key encrypting respective current-number of bytes;
the initiator client is further configured to request a second set of symmetric session keys from the server prior to all of a first set of symmetric session keys encrypting te a number of bytes associated with the first set of symmetric session keys.

46. The server computer system of claim 40, wherein providing of the second generated symmetric session key(s) from the server computer system to the initiator client is performed after a server-generated period of time following providing of the first symmetric session key to the initiator client.

47. The server computer system of claim 41, wherein the providing of the second generated symmetric session key from the server computer system to the initiator client is performed after a server-generated period of time following providing of the first symmetric session key to the initiator client.

48. The server computer system of claim 42, wherein providing of the second generated symmetric session key(s) from the server computer system to the initiator client is performed after a server-generated period of time following providing of the first symmetric session key to the initiator client.

49. The server computer system of claim 30, wherein the symmetric session key comprises a post-quantum level of security, and wherein the at least one processor of the server computer system is further configured to execute instructions to generate the symmetric session key with a random number generator.

50. The server computer system of claim 32, wherein the symmetric session key comprises a post-quantum level of security, and wherein the at least one processor of the server computer system is further configured to execute instructions to generate the symmetric session key with a random number generator.

51. The server computer system of claim 34, wherein the symmetric session key comprises a post-quantum level of security, and wherein the at least one processor of the server computer system is further configured to execute instructions to generate the symmetric session key with a random number generator.

52. The server computer system of claim 35, wherein the symmetric session key comprises a post-quantum level of security, and wherein the at least one processor of the server computer system is further configured to execute instructions to generate the symmetric session key with a random number generator.

53. The server computer system of claim 37, wherein the symmetric session key comprises a post-quantum level of security, and wherein the at least one processor of the server computer system is further configured to execute instructions to generate the symmetric session key with a random number generator.

54. The server computer system of claim 38, wherein the symmetric session key comprises a post-quantum level of security, and wherein the at least one processor of the server computer system is further configured to execute instructions to generate the symmetric session key with a random number generator.

55. The server computer system of claim 39, wherein the symmetric session key comprises a post-quantum level of security, and wherein the at least one processor of the server computer system is further configured to execute instructions to generate the symmetric session key with a random number generator.

56. The server computer system of claim 40, wherein the symmetric session key comprises a post-quantum level of security, and wherein the at least one processor of the server computer system is further configured to execute instructions to generate the symmetric session key with a random number generator.

57. The server computer system of claim 41, wherein the symmetric session key comprises a post-quantum level of security, and wherein the at least one processor of the server computer system is further configured to execute instructions to generate the symmetric session key with a random number generator.

58. The server computer system of claim 42, wherein the symmetric session key comprises a post-quantum level of security, and wherein the at least one processor of the server computer system is further configured to execute instructions to generate the symmetric session key with a random number generator.

\* \* \* \* \*